United States Patent [19]
Warrington et al.

[11] Patent Number: 5,489,112
[45] Date of Patent: Feb. 6, 1996

[54] HITCH MOUNT

[76] Inventors: Bruce Warrington, 32742 Alipaz #80, San Juan Capistrano, Calif. 92675; Tom Dula, 5102 Valencia Dr., Orange, Calif. 92669

[21] Appl. No.: 314,352

[22] Filed: Sep. 27, 1994

[51] Int. Cl.$^6$ .............................. B60R 9/06; B60R 1/04
[52] U.S. Cl. .................... 280/495; 280/500; 280/505; 280/510; 280/514; 280/769; 224/282
[58] Field of Search .................... 280/495, 500, 280/502, 505, 508, 510, 514, 461.1, 769; 248/316.5; 24/522, 523, 525; 224/280, 536, 282, 42.26

[56] References Cited

U.S. PATENT DOCUMENTS

| | | | |
|---|---|---|---|
| 831,977 | 9/1906 | Nilsen | 280/510 |
| 1,447,146 | 2/1923 | Novak | 280/510 X |
| 2,248,005 | 7/1941 | Lyman | 280/510 |
| 2,869,654 | 1/1959 | Hershman | 280/510 X |
| 3,098,309 | 7/1963 | Koch | 280/502 X |
| 4,340,240 | 7/1982 | Anderson | 280/461.1 |
| 4,906,039 | 3/1990 | Broman | 280/769 X |
| 4,962,945 | 10/1990 | Vannoy et al. | 280/508 |

Primary Examiner—Margaret A. Focarino
Assistant Examiner—F. Zeender
Attorney, Agent, or Firm—Patent Law & Venture Group; Gene Scott

[57] ABSTRACT

A support mounting unit is provided for mounting a transportable cart or like apparatus to a vehicle so as to provide an easy method of transport for an apparatus. The mounting unit includes a mounting means for securing the invention to the rear bumper of a vehicle, a top and bottom clamping jaw for securing the cart to the mounting unit, and an automatic locking mechanism. The top jaw of the invention is attached to a main body portion by means of hinges on each side of the body portion. The top jaw can then be moved from a nominally horizontal closed position to an angled upwardly open position. Thus, once a lower attachment bar secured to the transportable apparatus has been placed in the lower U-shaped bracket, the apparatus is rotated and the upper attachment bar pushes the top jaw into the open position. The attachment bar can now be secured in the U-shaped bracket embedded in top jaw, and the top jaw can return to a closed position where the locking bolt automatically secures it.

8 Claims, 2 Drawing Sheets

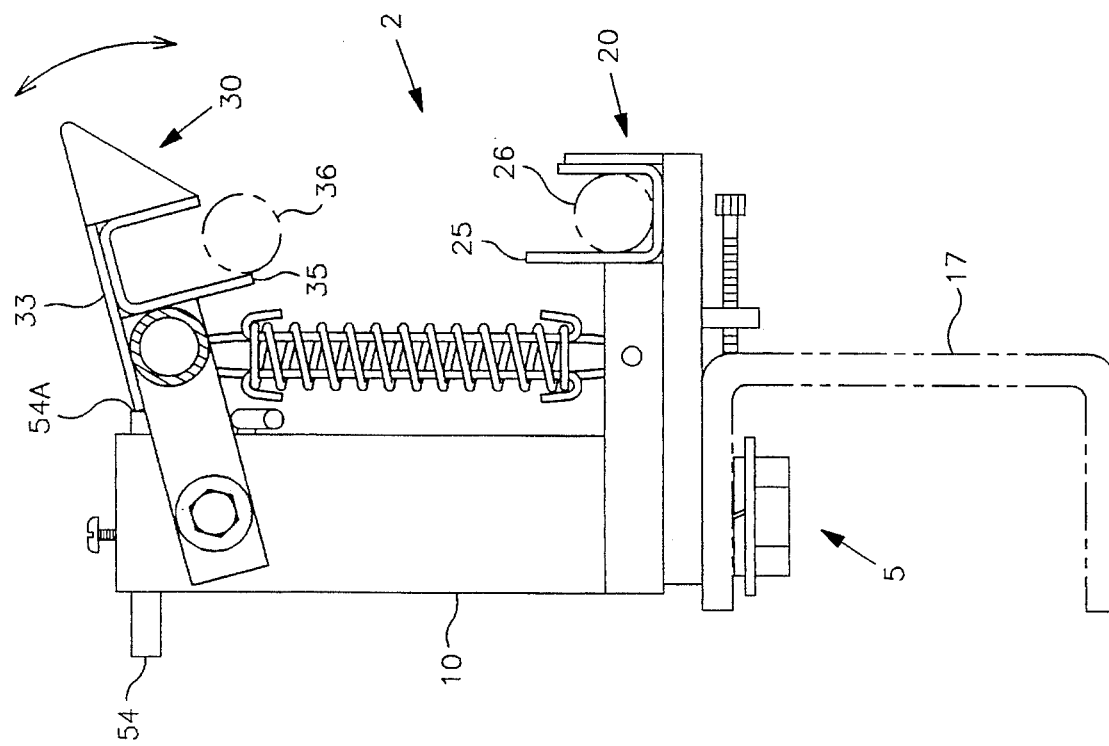
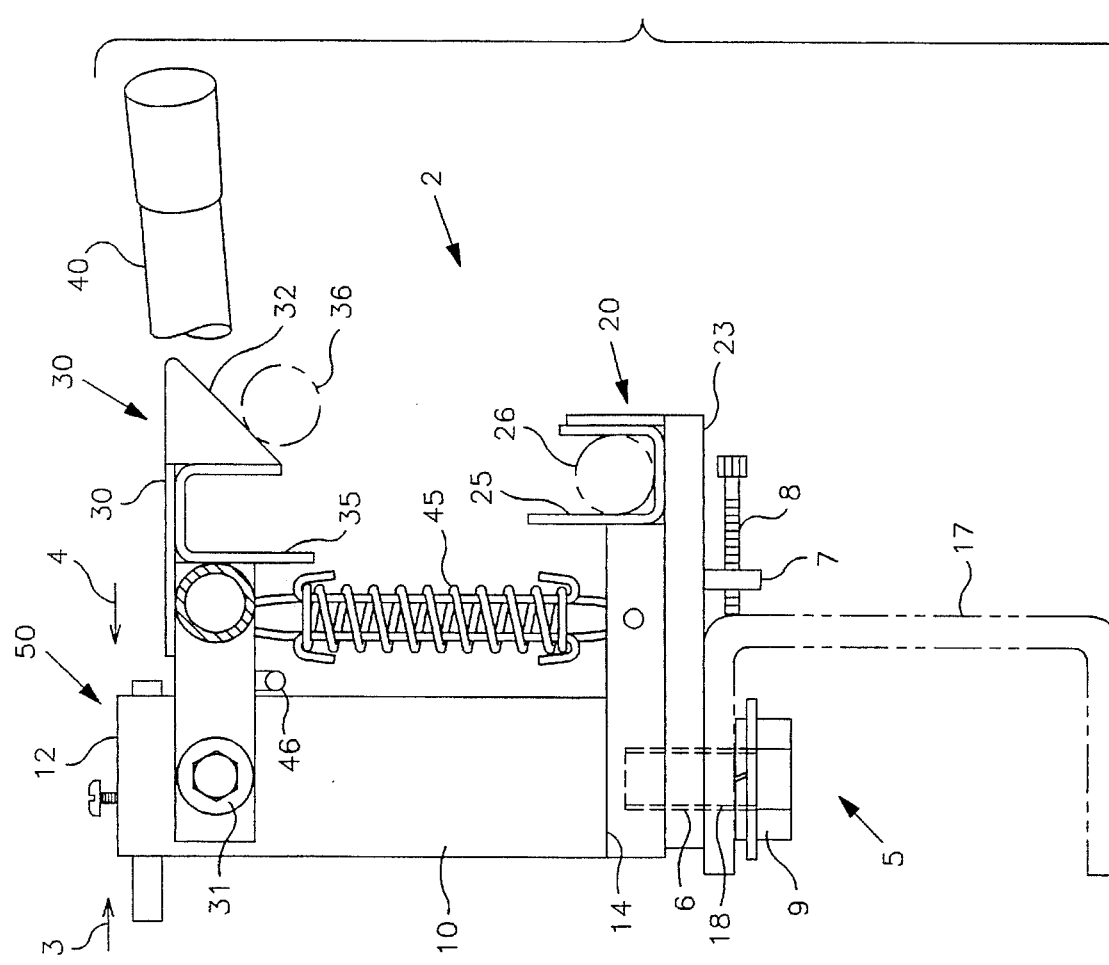
FIG 1B
FIG 1A

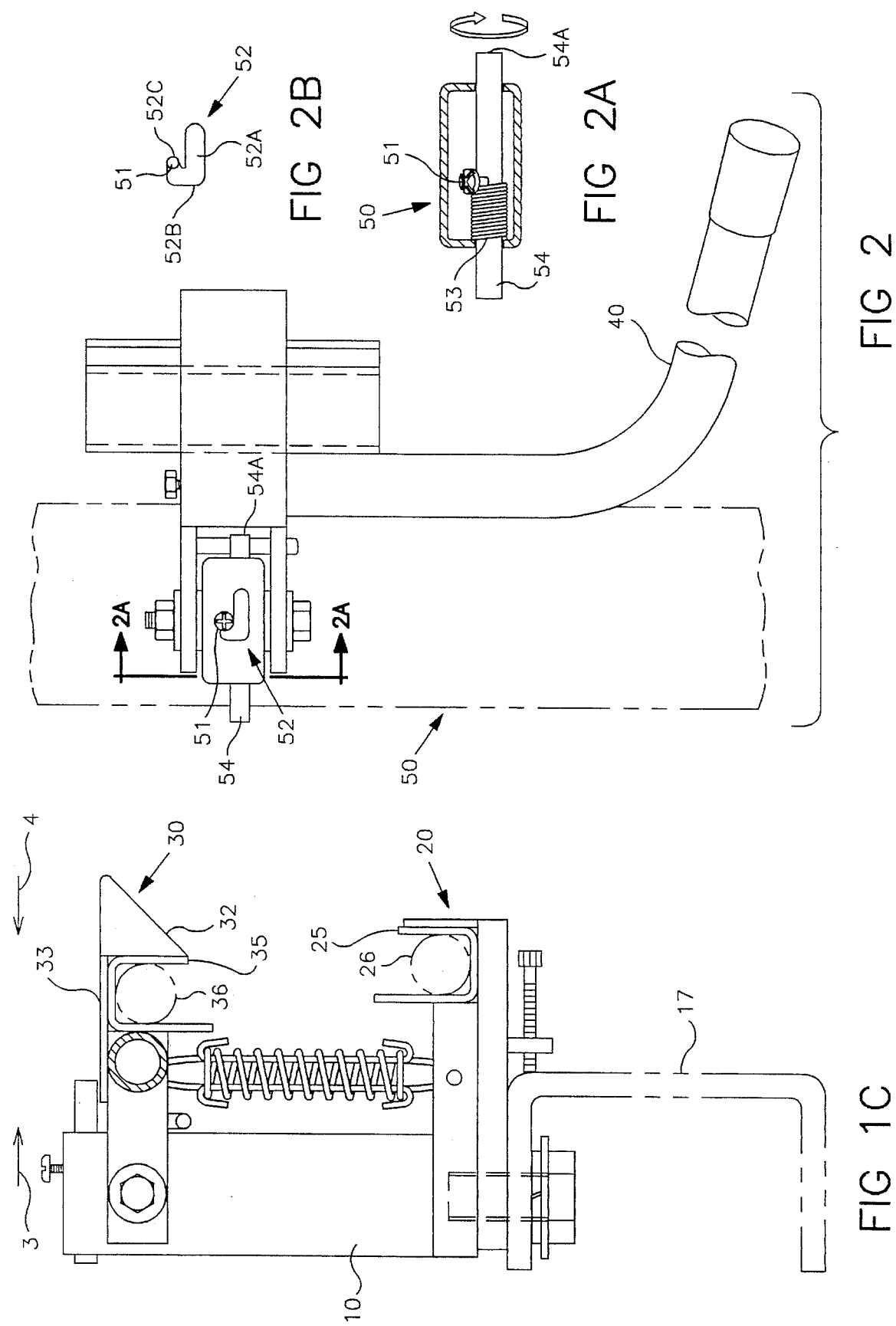

HITCH MOUNT

FIELD OF THE INVENTION

This invention relates generally to a hitching device and more particularly to a hitch mount with an easy means for attaching the mount to a rear bumper of a vehicle, a set of sturdy jaws that clamp to the desired transportable load and an automatic locking means to provide an efficient method for securing and transporting a cart or the like on a vehicle.

BACKGROUND OF THE INVENTION

Invention and use of hitches are known to the public. As for example, perhaps the most common hitch mount is the ball and socket mount. In this configuration, a metal standoff is fastened to the underside of a vehicle bumper or the vehicle itself, and extends horizontally beyond and away from the vehicle. Attached to the top surface of the standoff is a large metal ball, providing a hitching means for the desired load.

To attach the load to the ball hitch, a metal socket is necessary. This metal socket has a hollow underside in such a shape so that it can be engaged with the ball. The ball and socket are locked together but the socket can move laterally. Thus, as the vehicle makes a turn, the socket can rotate to accommodate a change in direction.

However, there are several problems with this standard ball and socket type mount. First of all, it requires that the user have a trailer or like carrier with the necessary socket. A load must be transferred to and secured on the carrier before it can be transported, which is generally inconvenient and time consuming. Another problem with these ball and socket mounts is that it is often difficult to secure the socket to the ball when the desired load is heavy. The user must back the vehicle up nearly right to the trailer, and then try to pull the socket and trailer up and over the ball. Obviously, this is not a very precise process, and often requires the vehicle to be backed up and repositioned several times.

To ease this process, trailer hitching guides have been created. For example, U.S. Pat. No. 4,871,185 to Richard O. Chakroff and Christopher N. Chakroff, introduces a trailer tongue alignment guide for centering the socket of a ball-type hitch above the ball as a vehicle is backed toward the trailer. The invention consists of a base plate with a flat bottom surface with a hole in it. The hole is aligned with the hole in the vehicle draw bar so that the base plate is clamped between the ball and the draw bar by means of the ball fastener. No portion of this base plate extends into any substantial engagement with other portions of the vehicle or with the draw bar and therefore the base plate may be easily mounted to any conventional, existing type draw bar. A rigid V-guide is removably mounted to the base plate by means of engaging male and female coupling members formed on the base-plate and the guide. These permit the guide to be simply lifted and removed from the base plate after the trailer socket is engaged with the ball, thus preventing the V-guide from restricting the articulation of the trailer with respect to the towing vehicle during turns.

While this invention can ease some of the difficulties associated with standard ball and socket hitches, the fact remains that it is still not convenient or easy to use. The user must first buy a ball and socket unit and attach it to the vehicle. The socket unit must then be attached to the trailer, and then, the alignment guide must also be attached to the vehicle. In addition, while the guide helps align the ball and socket, it still requires quite a bit of accuracy in backing up the vehicle.

Thus, there is a clear need for the present invention which provides a hitching system that can be utilized at either the front or rear of a vehicle. It is designed to directly contain a transportable load, thus eliminating the need for a trailer or like carrier. The new invention is further designed to allow a load to be conveniently affixed to the mount without necessitating several trials, using a guide, or employing the help of another person. Further, the new invention allows a load to be easily attached to the mount without requiring above average strength. Additionally, the new invention provides an automatic locking means, so as to ensure greater safety for the load. The prior art does not provide these advantages, while the present invention fulfills these needs and provides further related advantages.

SUMMARY OF THE INVENTION

The invention is a two-point mounted, hand operated hitch designed primarily for ease in attaching and transporting a load on the bumper of a vehicle. The base of the invention is a main support body that is vertically-oriented and rectangularly shaped. The support body includes a horizontally oriented bottom jaw integrally attached. The bottom jaw extends horizontally outwardly in a direction away from the bumper. At the top of the support body is a horizontally oriented top jaw mounted, by means of a hinge, to the support body. Like the bottom jaw, the top jaw extends outwardly away from the bumper and is in a parallel position above the bottom jaw.

Between these two jaws, running parallel to the support body, lies a bias means such as a spring to force the top jaw into a nominally horizontal closed position. At the top of the support body is a locking bolt which can be secured in a retracted position. When the bolt is unlocked the top jaw can be moved to an angled open position by means of a outwardly extending handle. Once the load is secured between the jaws and the top jaw is again moved to the closed position, the locking bolt automatically moves to a locked position to ensure that the top jaw will remain in the closed position during transport. In addition, a stop bar is located directly below the top jaw to ensure that the jaw will not drop below the horizontally closed position.

The method of attaching the new invention to the intended towing vehicle is by means of a support mount mounting means located on the downwardly facing surface of the bottom jaw. On this surface is a tapped hole, extending vertically upwards into the bottom jaw. This hole is then aligned with the hole on the top surface of the vehicle bumper and a bolt is placed from the underside of the top of the bumper vertically upward through the top bumper and into the mount's tapped hole. This secures the invention to the vehicle.

Once the invention is attached to the vehicle, it can then be attached to the load or other transportable apparatus. The load requires two custom-fit, horizontally-extending attachment bars secured with the distance between them comparable to that of the top and bottom jaws of the new invention. To mount the load, the lower attachment bar is placed into a U-shaped bracket of the lower jaw. Pressure is then applied to rotate the load so that the upper bar meets an angled guiding edge of the top jaw. This forces the top jaw into an open position which allows the upper attachment bar to contact an inverted U-shaped bracket, a part of the outwardly extending end of the top jaw.

When the top jaw is returned to the closed position, the top attachment bar is secured into the bracket and the locking bolt automatically slides to the locked position. The load is now secured to the vehicle and ready for transport. To remove the load, the locking bolt is manually unlocked and the handle is used to raise the top jaw to the open position, freeing the upper attachment bar from the bracket. The load can then be rotated so that the lower attachment bar is released from its bracket.

Thus the new invention provides an efficient support mount that can be easily attached to the bumper of a vehicle by means of a braced bolt and adjusting screws located at the bottom edge of the hitch. It is an object of the invention to allow simple attachment and detachment to a bumper or any other convenient mounting surface, with uncomplicated requirements of the surface prior to mounting, and using only hand tools and requiring only minimal strength. This object is attained because of the lightweight construction of the new invention. Another object is to provide a hitch with improved stability and durability, which is accomplished through the invention's steel construction and standard size bolt reinforcements.

It is a further object of the present invention to allow for quick and easy loading of the apparatus to be transported. It is also an object of the invention to provide a means for locking the apparatus into place once it is contained within the mount so as to ensure the security of the apparatus. Further, it is the object of this invention to provide greater convenience and safety by incorporating a locking mechanism that functions automatically into the invention.

It is another object of the invention to provide additional convenience in detaching the apparatus from the mount. Once the lock is manually released, the large handle can be employed for easily opening the hitch and releasing the apparatus.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1A is a left side elevational view of the invention showing an upper and a lower jaw, an lower attachment bar fitted within the lower jaw, an upper attachment bar ready to be received in the upper jaw, the invention shown mounted on an automobile bumper;

FIG. 1B is a similar view of the invention of FIG. 1A showing the upper jaw in an open attitude ready to clamp down upon the upper attachment bar;

FIG. 1C is a similar view of the invention of FIG. 1A showing the upper and lower jaws engaged with the upper and lower attachment bars respectively; FIG. 2 is a top plan view of the invention showing a locking bolt of the invention in the retracted unlocked position;

FIG. 2A is a sectional plan view along line 2A—2A, showing further details of the interior of a bolt locking mechanism of the invention;

FIG. 2B is a top plan view of the locking means hole in the top surface of the mount body, showing the L-shape of the hole and its inner sloped edge which captures and contains a screw, which is shown with the head portion removed.

DETAILED DESCRIPTION OF THE PREFERRED EMBODIMENT

FIGS. 1A–C show the instant invention, a support mount 2, used for supporting and transporting a load, preferably a transportable cart or similar apparatus, with a vehicle. The invention can be mounted to either a front or back standard C-shaped vehicle bumper 17, depending on the size of the load to be transported. Two metal attachment bars, an upper 36 and a lower 26, are affixed to the desired load so that they extend horizontally from the load. These bars are then secured into the support mount 2 and the load is ready to be transported.

FIGS. 1A–C show the support mount 2 attached to the vehicle bumper 17, which is shown in phantom. The bumper is further attached to a vehicle, which is not shown in the diagram. The basic components of the support mount 2 are a main support body 10, a top 30 and a bottom jaw 20, a mounting means 5, and a locking means 50. The main support body 10 is vertically oriented, and preferably of rectangular box shape. It includes an upfacing top surface 12 and a downfacing bottom surface 14.

The bottom jaw is attached integrally with the body's bottom surface 14, and is horizontally oriented so that it extends horizontally away from the vehicle and the bumper 17 in a first direction 3. The top jaw 30 is hingably mounted on each side of the main support body 10 by a hinge 31 near the top body surface 12 to provide a top clamping means. As illustrated in FIG. 1A, in the closed position the top jaw 30 extends horizontally in the first direction 3 away from the vehicle and the bumper 17. However, as shown in FIG. 1B, the top jaw 30 is movable from this nominally horizontal closed position to an angled upwardly open position. This movability of the top jaw 30 allows the mount 2 to easily accept the load and securely clamp it within the mount 2.

A biasing device 45, preferably in the form of a coil spring, extends between the top and the bottom jaws 30 and 20 providing a downward force on the top jaw 30 which forces it into the horizontal closed position. A stop bar 46, attached to the main body 10, is positioned for contact with the top jaw 30 when the it is in the closed position so as to prevent the top jaw 30 from moving downward to an undesirable position. In order to easily manipulate top jaw 30 into the open position, an outwardly curved handle 40 or similar grasping device, preferably constructed of round hollow tubing, is attached to and positioned on the top jaw 30. This handle 40 can be pulled upward to provide leverage to manipulate the top jaw 30 into the open position.

A downfacing surface 23 of the bottom jaw 20 is integrally attached to the mounting means 5. This mounting means 5 secures the mount 2 to the vehicle bumper 17. Preferably the mounting means 5 would consist of a vertically oriented tapped hole 6 running upward into the bottom jaw 20. The tapped hole 6 would be aligned with a clearance hole 18 that runs through the top edge of the standard C-shaped bumper 17. A bolt 9, or similar fastening means, would be placed through the bumper hole 18 and into the tapped hole 6. As an additional securing measure, a threaded standoff 7 could be attached horizontally across the downward facing bottom jaw surface 23. At each end of the standoff 7 would be a clearance hole through which a screw 8 or similar fastening means would pass until the tip of the screw 8 contacted the side edge of the vehicle bumper 17. Through this preferred mounting means 5, or any other compatible securing means, the support mount 2 is firmly attached to the vehicle's bumper 17 and ready to accept a transportable load.

To attach the load within the mount 2, the upper and lower attachment bars 36 and 26 of the load are each secured within a pair of brackets 35 and 25, which are contained integrally within the top 30 and jaw 20 respectively. The brackets 35 and 25 are positioned in the top 30 and bottom 20 jaws in opposing juxtaposition, with bracket 25 extending vertically upward from bottom jaw 20 and bracket 35 inverted so as to extend vertically downward from top jaw 30. The brackets 35 and 25 are of the shape and size so as to contain the attachment bars 36 and 26 securely within them.

The support mount 2 also includes the locking means 50, shown is FIGS. 2, 2A and 2B. Preferably, the locking means 50 includes a locking bolt 54, slidably engaged at the top of the main support body 2. The locking bolt 54 is secured in a retracted position by means of a screw 51, a spring 53 and an L-shaped hole 52 in the top body surface 12. The screw 51 is attached to the bolt 54 so that it protrudes vertically upward through the hole 52. The spring 53 is positioned around the locking bolt 54 to the screw 51. Thus, when the bolt 54 is in the retracted position, the spring 53 is compressed, thus providing force on the bolt 54 to rotate and move in the first direction 3. However, as seen in FIG. 2B, when the bolt is retracted, the screw 51, shown without a head, is lodged in a smaller portion 52B of the hole 52. A sloped edge 52C of the smaller hole portion 52B is shaped with a slight angle so that once the screw 51 enters the smaller hole portion 52B, the forward force of the spring 53 prevents the screw 51 from moving down the sloped edge 52C.

Thus the screw 51 can only be dislodged from the sloped edge 52C when an external force moves the bolt 54 or the screw 51 toward the vehicle in a second rotational direction 4. When this external force is greater than that of the spring 53, the spring 53 is further contracted and the screw 51 is moved away from the sloped edge 52C. When the external force is removed, the tension on the spring is released and it automatically rotates the screw 51 downward, out of the smaller hole portion 52B and in the first direction 3 down the hole's shaft 52A, in turn moving the bolt 54 from the retracted, open position to the extended, locked position. Likewise, when the bolt 54 is in the extended position, the spring 53 is also in its extended position and therefore the bolt 54 remains in the extended position until an outside force again overcomes the spring and returns the bolt 54 to the retracted position. While this is the preferred embodiment of the locking means, there are numerous other automatic locking assemblies that could also serve this purpose.

Thus, the method of securing the load to the mount 2 is as follows. The upper and lower attachment bars 36 and 26 are secured to the desired load so that they extend horizontally from the load. The mount 2 is secured to a vehicle bumper by the mounting means 5. As illustrated in FIG. 1A, initially the mount's top jaw 30 is in the horizontal closed position, and the locking bolt 54 is in the open, retracted position. The lower attachment bar 26, shown in phantom, is positioned within U-shaped bracket 25 in the bottom jaw 20. The upper attachment bar 36, also shown in phantom, then contacts the angled outer edge of the top jaw 30, which forms an integral guide surface 32.

As seen in FIG. 1B, when a downward rotational force is applied to the load, the upper attachment bar 36 moves down the guide surface 32 and forces the top jaw 30 to move into the angled open position. As the top jaw 30 is moving upwardly, its upfacing surface 33 strikes the locking bolt end 54A. As the top jaw continues to move upward, external force is applied to the bolt 54 in the second direction 4. This further contracts the spring 53 and allows the screw 51 to move away from the sloped edge 52C of the smaller hole portion 52B. When the top jaw 30 has moved to the fully open position and the upper attachment bar 36 has contacted the bracket 35, the top jaw can be moved back to the closed position. As force of the top jaw 30 on the bolt 54 is released, the tension on the spring 53 is also released, thus rotating the screw 51 downward into the hole's shaft 52A and through its length in the first direction 3.

Thus, as illustrated in FIG. 1C, when the jaw is returned to the closed position, the upper attachment bar 36 is secured within the bracket 35. Further, by releasing the screw 51, the bolt 54 has automatically moved into the extended, locked position. The load is now secured for transport. When it is desired to remove the load from the mount 2, the screw 51 is then manually returned to its position lodged against the sloped edge 52C of the hole's smaller portion 52B, thus returning the lock 54 to the retracted, open position. The handle 40 can then employed to move the top jaw 30 into the open position in order to free the attachment bar 36 from the bracket 35. The load can then be upwardly rotated to remove the lower attachment bar 26 from the bracket 25.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A support mount for supporting a transportable apparatus on a vehicle comprising:

a vertically oriented main support body having an upfacing top surface and a downfacing bottom surface;

a horizontally oriented bottom jaw integral with the bottom surface and extending horizontally in a first direction therefrom and providing a support mount mounting means therein, and a bottom clamping means thereon;

a horizontally oriented top jaw hingably mounted to the main support body by a hinge means near the top surface thereof and extending horizontally in the first direction therefrom and providing a top clamping means thereon, the top jaw movable from a nominally horizontal closed position to an angled upwardly open position for advantageously engaging the transportable apparatus on the vehicle;

a bias means extending between the top and the bottom jaws providing a downward force on the top jaw to force said jaw into the nominally horizontal closed position;

a stop bar attached to the main support body and positioned for contacting the top jaw when said jaw is in the closed jaw position, preventing the top jaw from moving into a downwardly angled position;

the transportable apparatus being held between the top and the bottom jaws, the support mount being attached to the vehicle by the support mount mounting means.

2. The support mount of claim 1 further including a handle attached to and positioned on the top jaw so as to provide leverage in manipulating the top jaw into the open position.

3. The support mount of claim 2 further including a locking bolt slidably engaged in the main support body and positionable into, first, a retracted position held therein by a retracted engagement means, so as to provide clearance for the top jaw to move between the closed jaw position and the open jaw position, and second, an extended position, released from the retracted engagement means, so as to overlap the top jaw for preventing said top jaw from moving into the open jaw position.

4. The support mount of claim 3 wherein the locking bolt includes a means, positioned in the upfacing top surface, for securing the bolt in the extended position.

5. The support mount of claim 1 further including a guide surface integral with the top jaw, the surface positioned at an angle for guiding the transportable apparatus into the top jaw.

6. The support mount of claim 1 wherein the top clamping means is an inverted first U-shaped bracket and the bottom clamping means is a second U-shaped bracket, the first and the second U-shaped brackets being positioned in opposing juxtaposition.

7. The support of claim 3 further including a bolt biasing means positioned and configured to hold the bolt in engagement with the retracted engagement means in the retracted position and for releasing the bolt to move said bolt to the extended position in response to the bolt being pressed by the upper jaw upon engaging the transportable apparatus.

8. The support of claim 7 wherein the bolt biasing means is a coil spring engaged with the bolt and attached so as to move the bolt in linear translation between the extended and retracted positions, and further engaged with the bolt so as to rotate the bolt for moving same from the retracted engagement means.

* * * * *